(12) United States Patent
Wang et al.

(10) Patent No.: US 11,644,818 B1
(45) Date of Patent: May 9, 2023

(54) METHOD AND SYSTEM FOR PREDICTING PROCESS SEQUENCE FOR A VEHICLE MANUFACTURING PROCESS

(71) Applicant: Ford Global Technologies, LLC, Dearborn, MI (US)

(72) Inventors: Lijun Wang, Canton, MI (US); Seema Jain, Novi, MI (US); Shanshan Qiu, Troy, MI (US); Saumuy Puchala, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/675,253

(22) Filed: Feb. 18, 2022

(51) Int. Cl.
G05B 19/4155 (2006.01)

(52) U.S. Cl.
CPC ............ *G05B 19/4155* (2013.01); *G05B 2219/35135* (2013.01)

(58) Field of Classification Search
None
See application file for complete search history.

(56) References Cited

U.S. PATENT DOCUMENTS 7,684,892 B2    3/2010  Yuan et al.
2022/0391750 A1*  12/2022  Fagan ................. G06Q 10/06

FOREIGN PATENT DOCUMENTS

CN      105807741       7/2016
EP        3719736       10/2020

* cited by examiner

*Primary Examiner* — Ryan A Jarrett
(74) *Attorney, Agent, or Firm* — Burris Law, PLLC

(57) ABSTRACT

A method of predicting sequence for a manufacturing process to assemble a product based on a target plan for the manufacturing process includes retrieving, from a historical process database, a plurality of surrogate process segments based on the target plan, determining, for each surrogate process segment from the plurality of surrogate process segments, a segment similarity value based on a data analysis model, and generating a target process defining a process sequence for performing the manufacturing process based on the segment similarity values of the plurality of surrogate process segments and a sequence inference model that classifies the process segment of the target plan to sequences defined by the plurality of surrogate process segments. The target process includes data that defines a plurality of selected process steps and one or more workstations for the process segment of the target plan.

20 Claims, 5 Drawing Sheets

| Proc. Seg. ID | Step ID | Textual Description | Workstation ID | Tool ID | Part ID | Coordinates (X,Y,Z) |
|---|---|---|---|---|---|---|
| PS-1 | 2000 | GRASP PLASTIC BAG FROM [LOCATION] | WS1 | -- | BAG10 | (160,-200, 200) |
| | 2001 | POSITION SCREW ON TO SEAT | WS1 | SD012 | F12 | (160,-200, 200) |
| | 2002 | POSTION PLASTIC BAG ON TO SEAT | WS2 | -- | BAG10 | (150,-200, 200) |
| PS-2 | 2000 | PLACE (#) CENTER REAR CAP ON TO SEAT FASTENERS | WS2 | F15 | CP124 | (150,-200, 200) |
| | 2001 | PLACE (#) CENTER REAR CAP ON TO SEAT FASTENERS | WS2 | I15 | CP124 | (150,-200, 200) |
| | 2002 | OBTAIN (#) CENTER REAR CAP | WS2 | | CP124 | (150,-200, 200) |
| | 2003 | OPEN PLASTIC BAG | WS2 | | CP124 | (150,-200, 200) |
| | 2004 | DISCARD PLASTIC BAG | WS2 | | CP124 | (150,-200, 200) |

FIG. 3

METHOD AND SYSTEM FOR PREDICTING PROCESS SEQUENCE FOR A VEHICLE MANUFACTURING PROCESS

FIELD

The present disclosure relates to designing a manufacturing process for a vehicle.

BACKGROUND

The statements in this section merely provide background information related to the present disclosure and may not constitute prior art.

Designing a new manufacturing process can be a time-consuming process as engineers try to determine how to allocate parts, tools, and steps for assembling a product among multiple workstations. More particularly, the manufacturing process is defined one or more process segments, where each process segment including multiple process steps to be performed in a specific order.

One possible factor in designing the manufacturing process includes knowing the precedence of the steps. The precedence is defined as the order in which the steps need to be performed in order to assemble the product, as there might not be enough clearance for some parts to be installed if they are installed out of order. For example, with regard to a vehicle, it would be difficult to install the electrical wiring and connections cannot after installing the instrument panel. In addition, many dynamic factors can increase the complexity in designing the manufacturing process. For example, a new manufacturing process can include new processes (i.e., new process segments). Without any historical reference, the allocation of resources for the new processes is determined by domain experts. In addition, allocation of resources of existing processes (i.e., known process segments or known assembly steps) can be uncertain because existing processes are typically divided and distributed across multiple workstations. These and other issues related to designing a manufacturing process are addressed by the present disclosure.

SUMMARY

This section provides a general summary of the disclosure and is not a comprehensive disclosure of its full scope or all of its features.

In one form, the present disclosure is directed to a method of predicting sequence for a manufacturing process to assemble a product. The method includes obtaining a target plan for the manufacturing process, where the target plan defines a process segment to be performed during the manufacturing process. The process segment is defined by a plurality of a process steps for performing the process segment. The method further includes retrieving, from a historical process database, a plurality of surrogate process segments based on the target plan, where the historical process database stores a plurality of historical process segments for known manufacturing processes. Each historical process segment is defined by a plurality of known process steps provided in sequential order for performing the historical process segment, where the plurality of surrogate process segments are selected from among the plurality of historical process segments. The method further includes determining, for each surrogate process segment from the plurality of surrogate process segments, a segment similarity value based on a data analysis model configured to provide a quantitative value representing a textual similarity and a sequence similarity between the surrogate process segment and the process segment of the target plan, and generating a target process defining a process sequence for performing the manufacturing process based on the segment similarity values of the plurality of surrogate process segments and a sequence inference model that classifies the process segment of the target plan to sequences defined by the plurality of surrogate process segments. The target process includes data that defines a plurality of selected process steps and one or more workstations for the process segment of the target plan.

In one form, for determining the segment similarity value, the data analysis model further includes comparing data indicative of the surrogate process segment with data indicative of the process segment using a natural language process model to determine a sequential pattern, and determining a process similarity value for the surrogate process segment based on the sequential pattern.

In one form, the process similarity value is determined using a universal sentence encoder.

In one form, the target plan identifies one or more components to be employed for the process segment, and each of the historical process segments identifies one or more known components to be employed for the historical process segment.

In one form, the method further includes comparing the one or more known components with the one or more components of the target plan using a string-matching model to determine a component similarity value, where the segment similarity value is a summation of the process similarity value and the component similarity value.

In one form, the string-matching model employs Levenshtein distance.

In one form, the target plan is defined by a plurality of the process segments, and the method further includes classifying each of the process segments as a novel process segment or a documented process segment. The method further includes retrieving, from the historical process database, one or more proxy process segments for the novel process segment, where the one or more proxy process segments are selected from among the plurality of historical process segments based on the one or more components of the novel process segment. At least one component of the one or more components of the novel process segment match at least one component provided in the proxy process segments. The plurality of surrogate process segments are selected for the documented process segments of the target plan. The method also includes determining, for the one or more proxy process segments, an overall proxy similarity value of the proxy process segment based on the data analysis model, where the target process is further generated based on the overall proxy similarity values of the proxy process segments and the sequence inference model.

In one form, the sequence inference model is a Bayesian inference based model.

In one form, generating the target process further includes selecting a desired sequence from the sequences defined by the surrogate process segments based on a pooling model, where the desired sequence has highest similarity value than other sequences.

In one form, the present disclosure is directed to a method of predicting sequence for a manufacturing process to assemble a product. The method includes obtaining a target plan for the manufacturing process, where the target plan defines a process segment to be performed during the manufacturing process using one or more components. The process segment is defined by a plurality of a process steps provided in a sequential order for performing the process segment. For the process segment, the target plan includes a target process data and a target component data that identifies the one or more components to be employed for the process segment. The method further includes retrieving, from a historical process database, a plurality of surrogate process segments based on the target process data, where the historical process database stores a plurality of historical process segments for known manufacturing processes using one or more known components. Each historical process segment is defined by a plurality of known process steps provided in sequential order for performing the historical process segment. The plurality of surrogate process segments are selected from among the plurality of historical process segments, and the historical process segment includes a known process data, a known component data, and an allocated workstation data. The method further includes determining, for each surrogate process segment from the plurality of surrogate process segments, a segment similarity value based on a data analysis model, where the data analysis model is configured to provide a quantitative value representing a textual similarity and a sequence similarity between the surrogate process segment and the process segment of the target plan. The method further includes generating a target process defining a process sequence for performing the manufacturing process based on the segment similarity values of the plurality of surrogate process segments and a sequence inference model that classifies the process segment of the target plan to sequences defined by the plurality of surrogate process segments. The target process includes data that defines a plurality of selected process steps and one or more workstations for the process segment of the target plan.

In one form, the data analysis model, for determining the segment similarity value, further includes comparing the known process data with the target process data using a natural language process model to determine a sequential pattern, determining a process similarity value for the known process data relative to the target process data based on the sequential pattern, and comparing the known component data with the target component data using a string-matching model to determine a component similarity value, where the segment similarity value is a summation of the process similarity value and the component similarity value.

In one form, the string-matching model employs Levenshtein distance.

In one form, the process similarity value is determined using a universal sentence encoder.

In one form, for each of the plurality of process steps, the target process data includes a textual data string describing a respective process step and a process time. For each of the plurality of known process steps, the known process data includes a textual data string describing a respective known process steps and a known process time for the known process step, and the natural language process model employs a universal sentence encoder to define numerical vectors to process the textual data string of the known process data and of the target process data.

In one form, the sequence inference model is a Bayesian inference based model.

In one form, the target plan is defined by a plurality of the process segments, the method further includes classifying each of the process segments as a novel process segment or a documented process segment based on the target process data for the process segment and the known process data of the plurality of historical process segments. The method further includes retrieving, from the historical process database, one or more proxy process segments for the novel process segment based on the target component data of the novel process segment, where the one or more proxy process segments are selected from among the plurality of historical process segments based on the target component data and the known component data. The known component data of the proxy process segments matches at least one component provided in the target component data of the novel process segment. The plurality of surrogate process segments are selected for the documented process segments of the target plan. The method further includes determining, for the one or more proxy process segments, an overall proxy similarity value of the proxy process segment based on the data analysis model, where the target process is further generated based on the overall proxy similarity values of the proxy process segments and the sequence inference model.

In one form, the target process data includes a process identification for the process segment, and the known process data includes a known process identification for a respective historical process segment. The process segment among the plurality of the process segments is classified as the documented process segment in response to the process identification matching the known process identification. The method further includes the process segment among the plurality of the process segments is classified as the novel process segment in response to the process identification not matching the known process identification of the known process segments in the historical database.

In one form, the target component data includes data indicative of a tool identification, a tool name, a manufacturing part identification, a manufacturing part name, or a combination thereof. The method further includes the known component data includes data indicative of a known tool identification, a known tool name, a known manufacturing part identification, a known manufacturing part name, or a combination thereof, and the known component data of the proxy process segment matches at least one data of the target component data of the novel process segment.

In one form, the target component data includes data indicative of a tool identification, a tool name, a manufacturing part identification, a manufacturing part name, or a combination thereof. The known component data includes data indicative of a known tool identification, a known tool name, a known manufacturing part identification, a known manufacturing part name, or a combination thereof.

In one form, generating the target process further comprises selecting a desired sequence from the sequences defined by the surrogate process segments based on a pooling model, where the desired sequence has highest similarity value than other sequences.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is an example data record provided in a historical process database;

Figure 1:
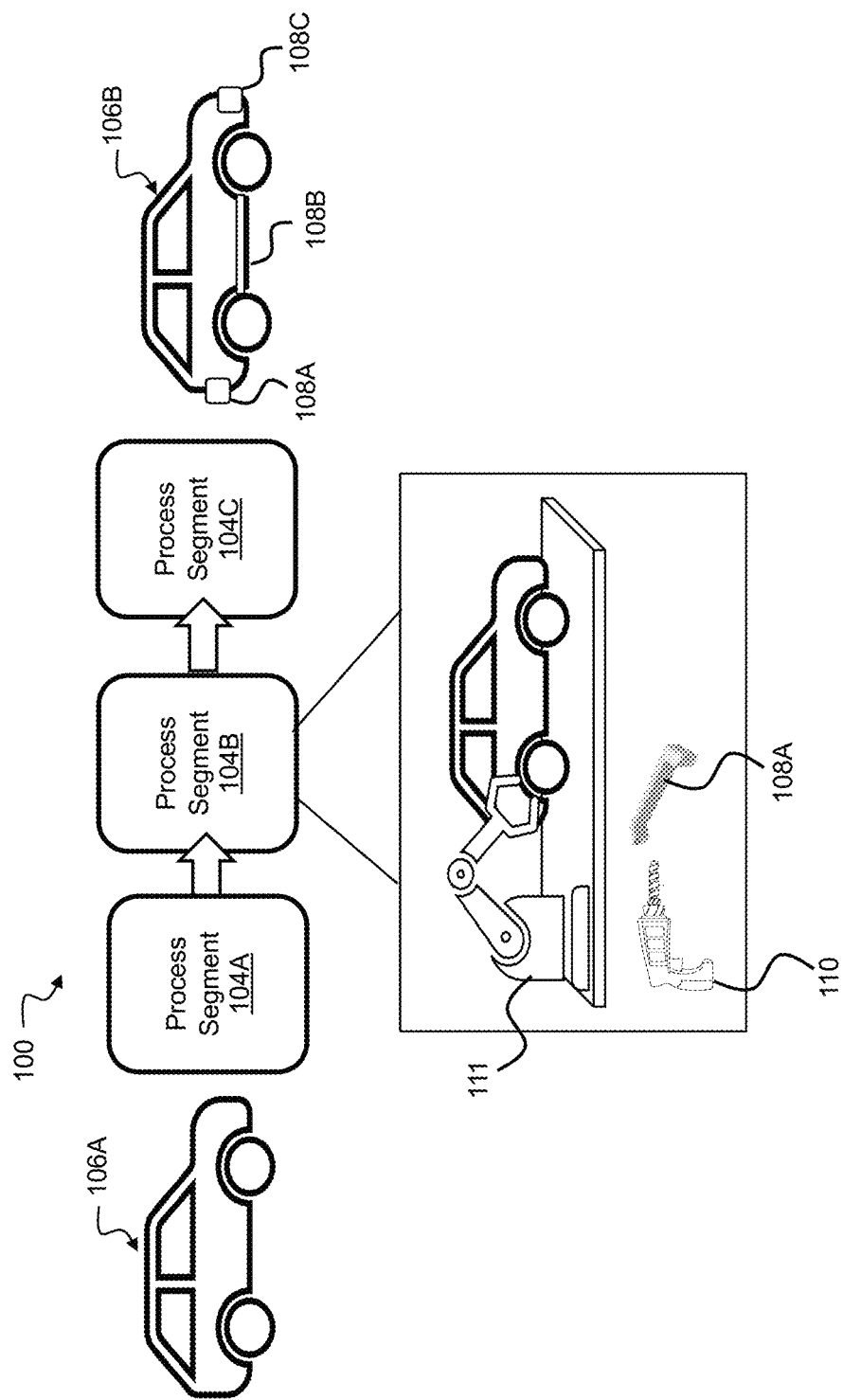
FIG. 1 is an example illustration of a manufacturing process in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a manufacturing process 100 is defined by a series of steps for assembling a product. More particularly, in the example application, the manufacturing process 100 includes multiple process segments 104A, 104B, 104C (collectively "process segments" 104) and each process segment 104 is defined by a plurality of process steps provided in a predefined order or sequence for performing the process segment 104. As an example, the manufacturing process 100 receives a vehicle 106A that undergoes process steps of process segments 104 for assembling workpieces 108A, 108B, 108C to the vehicle 106A. In FIG. 1, reference character "106A" is used to identify the vehicle at the start of process segment 104A and reference character "106B" is used to identify the vehicle at the end of process segment 104C (collectively "vehicle 106"). For the process segment 104B, the process steps to be performed may include: (1) obtaining a power tool 110; (2) obtaining two fasteners (not shown); (3) securing the workpiece 108A to the vehicle 106 using the two fasteners, the power tool 110, and a robotic system 111; and (4) returning the power tool 110 to a staging area (not shown).

In one form, in addition to the process steps, each process segment 104 further identifies components utilized for performing the process segment. In a non-limiting example, the component can include one or more tools (e.g., hand tools, robotic systems, fixtures, etc.), one or more workpieces (e.g., parts to be assembled to product), or a combination thereof. For example, the components of the process segment 104B includes the workpiece 108A, the tool 110, and/or the robotic system 111. The manufacturing process 100 is executed at multiple workstations, where each process segment 104 is associated with a designated workstation at which the process steps are to be performed.

The allocation of the workstations and the process steps to be performed at the workstations may vary based on several factors, such as but not limited to: facility at which the manufacturing process is to be performed, the components employed for the process steps (e.g., size of workpieces/tools), and orientation of the object/product as it enters and leaves the manufacturing process, and more particularly, the workstations. For example, a selected manufacturing process for a first vehicle may include some of the same steps as that of a second vehicle, which is a bigger vehicle than that of the first vehicle, but the process segments might be different. For instance, a manufacturing assembly line for the second vehicle may include additional clearance to perform the steps of the manufacturing process, and therefore the order in which the steps are to be performed and arrangement of the workstations may be different from that of the first vehicle.

The present disclosure provides a process prediction system for generating a target process for performing a manufacturing process using historical data of existing or known manufacturing processes. As described herein, a sequence inference model is configured to classify a process segment of a target plan to sequences defined by multiple surrogate process segments identified from the historical data. The target process generated by the process prediction model includes data that defines a plurality of selected process steps for the process segments provided in the target plan and one or more workstations for performing the selected process steps the process segment of the target plan.

While the manufacturing process is described with respects to a vehicle assembly, it should be understood that the teachings of the present disclosure may be applicable to other manufacturing application and should not be limited to automotive applications.

As used herein, a "process segment" is defined by one or more process steps that are provided in sequential order for performing the process segment.

As used herein, a "component" is an object that is employed during the process segment and may include, but should not be limited to: workpieces to be assembled, tools, robotic systems, and/or fixtures for supporting workpieces.

As used herein, "a target plan" provides information related to a new manufacturing process being designed and includes data related to one or more process segments to be performed during the new manufacturing process (i.e., a target process segment). In the following, the term "target" is employed to associate the subsequent element to the target plan. Accordingly, a "target process segment" is a process segment defined in the target plan, "target process steps" are process steps for the target process segment, a "target component" is a component defined in the target plan, etc.

Figure 2:
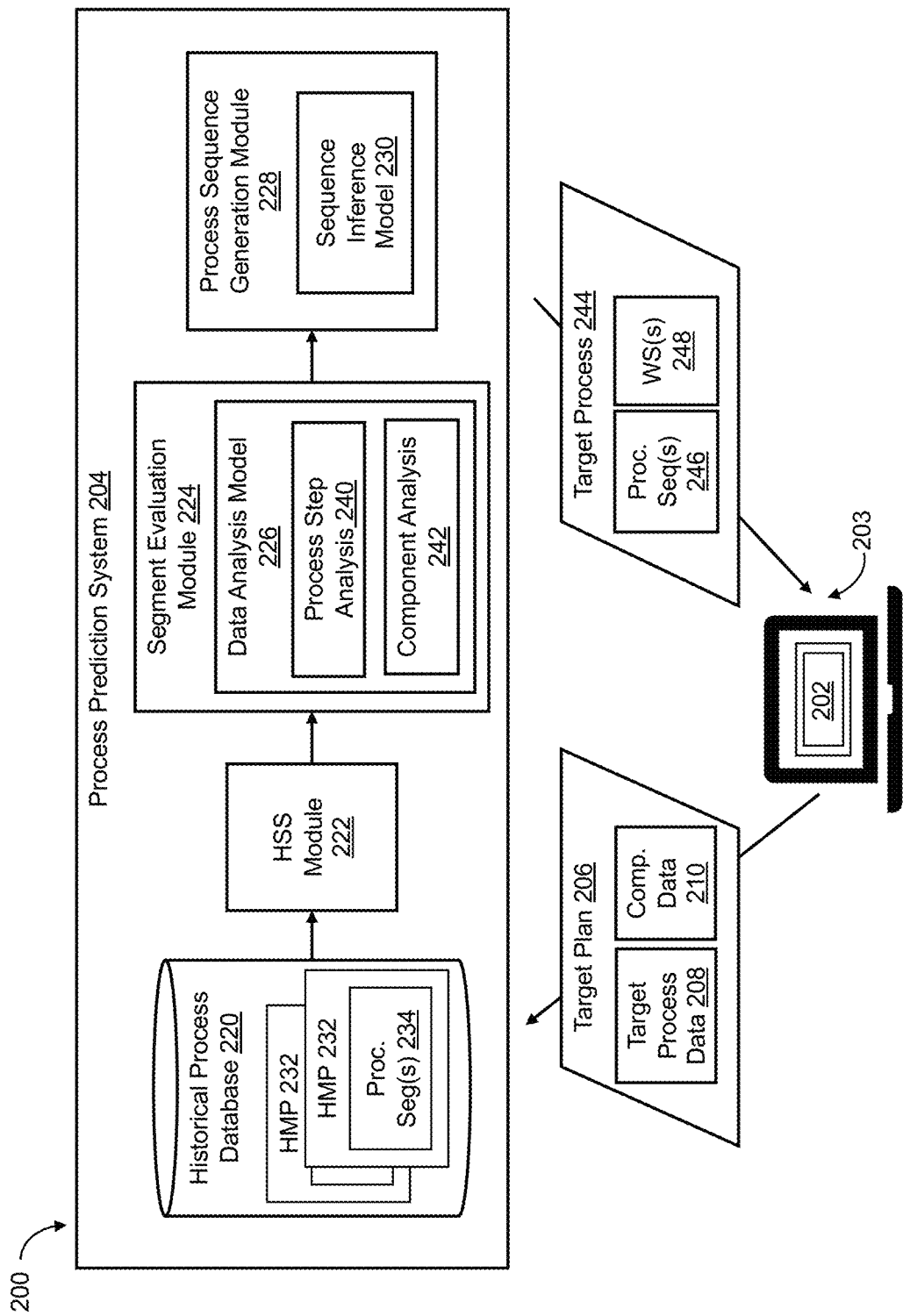
FIG. 2 is an example block diagram of a process prediction system in accordance with the present disclosure.

Referring to FIG. 2, an example system 200 for developing a target process for a target plan is provided. In one form, the system 200 includes a manufacturing design (MD) portal 202 and a process prediction system 204. The MD portal 202 is an interface to provide a user access to the process prediction system 204. In one form, the MD portal 202 is accessible via a computing device 203 that is in communication with the process prediction system 204 via, for example, the internet and/or a communication network. The computing device 203 may include a desktop computer, a laptop, a smartphone, a tablet computer, or the like.

Using the MD portal 202, the user provides a target plan 206 that identifies one or more target process segment(s) and in some instances target components employed for the target process segments. The target process segment is defined by a plurality of a target process steps provided in a sequential order for performing the target process segment. Accordingly, in one form, the target plan 206 includes target process data 208 and a target component data 210. The target process data 208 includes identification (ID) data for identifying the target process segment (i.e., the target process ID), identification for each target process step of the target process segment (i.e., a step ID), textual description of the target process steps of the target process segment, a target process time for each target process step, or a combination thereof. The target component data 210 includes data that identifies the one or more target components to be employed for the target process segments and may include, for example, data indicative of a tool identification, a tool name, a manufacturing part identification, a manufacturing part name, manufacturing part coordinates (i.e., coordinate/position data of the workpiece and/or product during the process segment), or a combination thereof.

In one form, the process prediction system 204 includes a historical process database 220, a historical segment selection (HSS) module 222, a segment evaluation module 224 having a data analysis model 226, and a process sequence generation module 228 having a sequence inference model 230. It should be understood that the modules and the database of the process prediction system 204 may be positioned at the same location or distributed at different locations (e.g., at one or more edge computing devices) and communicably coupled accordingly.

The historical process database 220 is configured to store data related to historical manufacturing processes (HMP) 232, where each HMP 232 is defined by one or more historical process segments (Proc.Seg(s)) 234 for performing the HMP 232. In one form, the HMP 232 are previous designed and implemented manufacturing processes, and thus, may also be referenced as known manufacturing processes. Each historical process segment 234 is defined by a plurality of known process steps provided in sequential order for performing the historical process segment 234. In addition to the known process steps, the historical process segment 233 identifies one or more known components to be employed for the historical process segment 232. In one form, each HMP 232 is provided a data record capturing data related to the historical process segment 234 and the data may include a known process data, a known component data, and an allocated workstation data at which the historical process segment 234 is executed for the HMP 232. The known process data includes identification data for identifying the historical process segment (i.e., the historical process ID), identification for each known process step of the historical process segment (i.e., a known step ID), textual description (i.e., textual data string) of the known process steps of the historical process segment, or a combination thereof. The known component data provides information regarding the components employed for the historical process segment and may include data indicative of a known tool identification, a known tool name, a known manufacturing part identification, a known manufacturing part name, a known coordinate/position of the workpiece and/or product during the process segment or a combination thereof.

As an example, referring to FIG. 3, a data record 300 for the HMP 232 is provided. The data record 300 includes a process segment ID 302 for each historical process segment 234 of the HMP 232, a step ID 304 for each known process step for a given historical process segment 234, a textual description (i.e., textual data string) 306 for the known process step, a workstation ID at which the process step is to be performed, a tool ID 310, a part (i.e., a workpiece) ID 312, and coordinates 314 for the product at the workstation. It should be readily understood that the data record for the HMP 232 is not required to include all of the data provided in FIG. 3. For example, the coordinate information may be omitted. In addition, it is possible the process segment may not be associated with a tool as a component, and thus, a tool ID may not be provided. In another variation, other data may also be used such as workstation size, a known process time for each performing each process step.

Referring to FIG. 2, the HSS Module 222 is configured to receive the target plan 206 and classify the target process segments provided in the target plan 206 based on the data in historical process database 220 to obtain one or more surrogate process segments for the target plan. The surrogate process segments are selected from among the historical process segments stored in the database 220. Specifically, in one form, the HSS module 222 compares each of the target process segments to the historical process segments in the database 220 to determine if there is a match. For example, the HSS module 22 is configured to compare the process ID provided in the target process data for the target process segments with the process IDs provided in the known process data for the historical process segments. If the target process ID matches that of one or more historical process segments in the database 220, the target process segment is a documented process segment and the HSS module 222 obtains data related to the one or more historical process segments that match. The matched historical process segments are provided as surrogate process segments.

If the target process ID does not match, the target process segment is a novel proess segment, and the HSS module 222 is configured to determine if other data provided with the target plan for the target process segment correlates to data in the historical process database 220. For example, in one form, the HSS module 222 compares the component data related to the target process segment with the known component data in the database 220. If there is one or more matches, the HSS module 222 obtains data related to the historical process segments that have the matching known component data, which are referenced as proxy process segments. That is, a proxy process segment includes component data that matches at least one target component provided in the target component data. For example, the target process segment and the proxy process segment may employ the same tool. Alternatively, or addition to, the target process segment and the proxy process segment may have the same workpiece. If the target component data does not match any known component data in the database, the target process segment, may be flagged for additional review. The HSS module 222 evaluates each target process segment of the target plan as described herein.

For each of the surrogate process segments and/or the proxy process segments, the segment evaluation module 224 is configured to determine a segment similarity value based on the data analysis model 226. Specifically, the data analysis model 226 is configured to provide a quantitative value representing a textual similarity and a sequence similarity between the surrogate/proxy process segment and the target process segment of the target plan. In one form, the data analysis model 226 includes a process element (PE) analysis 240 to analyze data related to known process steps to determine a process similarity value and a component (Comp.) analysis 242 to analyze component data to determine a component similarity value. The data analysis model 226 generates a segment similarity value as a summation of the process similarity value and the component similarity value.

The process element analysis 240 is configured to determine the segment similarity value. Specifically, the process element analysis 240 compares data indicative of the surrogate process segment (i.e., known process data) with data indicative of the target process segment (i.e., target process data) using a natural language process model to determine a sequential pattern. That is, process steps for a respectively process segment are provided in sequential order, and the textual descriptions for the process steps are imperative sentences that provide work actions and objects. The natural language process model employs a universal sentence encoder to determine the semantic meaning of the textual description. In particular, the textual descriptions of the process steps of a given process segment are represented as numerical vectors using universal sentence encoder. Specifically, since the process steps have a sequential dependency, the process element analysis 240 is configured to use a self-attention mechanism to find sequential patterns among the process steps of the given process segment and the sequential patterns are transformed into a vector for the given process segment. Accordingly, the process element analysis 240 defines a numerical vector for each known process segment and for the target process segment. For a selected known process segment, the segment similarity value is provided as a cosine distance between the numerical vectors of the selected known process segment and the targe process segment. In addition to the textual description, the known process data and target process data may include a process time for each of the process steps.

In one form, the component analysis 242 is configured to employ a string-matching model to determine a component similarity value. Specifically, using the string-matching model, the component analysis 242 compares data related to one or more known components (i.e., known component data) with data related to one or more target components (i.e., target component data) to determine the component similarity value for the known components of the surrogate process segment. In a non-limiting example, if target component data is a manufacturing part ID, the component analysis 242 compares the character string with a manufacturing part ID provided in the known component data, and determines a similarity value using string-matching model. In one example, the string-matching model employs Levenshtein distance to quantify the similarity of the component data.

In one form, the segment evaluation module 224 analyzes each proxy process segment in a similar manner as the surrogate process segment to determine an overall proxy similarity value of the proxy process segment. In one example, data related to the proxy process segment may only undergo the component analysis 242, such that the overall proxy similarity value for the proxy process segment is based only on the component similarity value. In another example, the proxy process segment may undergo both the process element analysis 240 and the component analysis 242 in a similar matter as that of the surrogate process segment, and the overall proxy similarity value is a summation of the process similarity value and the component similarity value.

The process sequence generation module 228 is configured to generate a target process 244 that defines a process sequence 246 for performing the target manufacturing process and provides one or more workstation (WS(s)) 248 at which the process sequences 246 are to be performed. The process sequence generation module 228 generates the target process 244 based on the sequence inference model 230, the segment similarity values of the plurality of surrogate process segments, and if available, the overall proxy similarity values of the proxy process segments. The target process 244 includes data that defines a plurality of selected process steps for each target process segment (i.e., the process sequence 246) and an allocated workstation at which the target process segment is performed. The sequence inference model 230 is configured to classify the target process segment(s) of the target plan to sequences defined by the plurality of surrogate process segments. In one form, the sequence inference model 230 is a Bayesian inference-based model. More particularly, using the Bayesian inference, the sequence inference model 230 is configured to classify the target process segments to a sequence, and further classify individual process steps.

In an example application, the known process steps for each surrogate process segment are grouped as one historical segment within one workstation. Suppose $T_i$ is the $j^{th}$ target process segment, $H_j$ is the $j^{th}$ surrogate process segment, $H_{jk}$ is the $k^{th}$ process step of $H_j$, then based on Bayesian theorem, $P(H_{jk}|T_i)$ is provided as the probability of $T_i$ matching to historical segment $H_{jk}$ (equation 1 below) and $P(H_{jk}|T_{im})$ is the probability of individual process steps (i.e., $m^{th}$ elements) of T, matching to $H_{jk}$ (equation 2 below). In other words, the model determines probability that the $T_i$ can be classified as $H_{jk}$ (equation 1) and each target process steps of the target segment $T_i$ can be classified as $H_{jk}$ (equation 2).

$$P(H_{jk} \mid T_i) = \frac{P(T_i \mid H_{jk}) \times P(H_{jk})}{P(T_i)} \sim sim(H_{jk}, T_{ik}) \times freq(H_{jk}) \quad \text{Equation 1}$$

$$P(H_{jk} \mid T_{im}) \sim P(H_{jk} \mid T_i) \sim sim(H_{jk}, T_{ik}) \times freq(H_{jk}) \quad \text{Equation 2}$$

In equations 1 and 2, $sim(H_{jk}, T_{ik})$ is the overall similarity value of $H_{jk}$ to $T_{ik}$ as determined by the segment evaluation module 224, an example of which is provided in Equation 3, and $freq(H_{jk})$ approximates the prior probability of $H_{jk}$, that is $P(H_{jk})$. In equation 3: "similarity $(H_{parts_{jk}}, T_{parts_{ik}})$" represents a component similarity value between the part/workpiece employed in the surrogate process segment and the target process segment; "similarity $(H_{tools_{jk}}, T_{tools_{ik}})$" represents a component similarity value between the tool employed in the surrogate process segment and the target process segment; "similarity $(H_{step_{jk}}, T_{step_{ik}})$" represents a segment similarity between the process steps of the surrogate process segment and the target process segment; and "similarity $(H_{xyz_{jk}}, T_{xyz_{ik}})$" represents a component similarity value between the coordinates of the workpiece as provided in the surrogate process segment and the target process segment. It should be readily understood that the overall similarity value is not required to include each of the different types of similarities. For example, coordinate similarity may not be used. In another example, if data related to the component (e.g., tool or workpiece/part) is not provided the component similarity value would just be zero. The process sequence generation module 228 is configured to select the surrogate process segment having the highest probability as the target process for the target plan, which is represented in equation 4.

$$sim(H_{jk}, T_{ik}) = \text{similarity}(H_{parts_{jk}}, T_{parts_{ik}}) \quad \text{Equation 3}$$
$$+ \text{similarity}(H_{tools_{jk}}, T_{tools_{ik}})$$
$$+ \text{similarity}(H_{step_{jk}}, T_{step_{ik}})$$
$$+ \text{similarity}(H_{xyz_{jk}}, T_{xyz_{ik}})$$

$$seq(T_{im}) = seq(argmax_{jk}(P(H_{jk} \mid T_{im}))) \quad \text{Equation 4}$$

In one form, the process sequence generation module 228 is further configured to generate the target process using a pooling model to select a desired sequence from the sequences defined by the surrogate process segments/proxy process segment. Specifically, in some instances, numerous process steps that are similar may exist in different segments, and therefore, could be assigned to several sequences. The pooling model is configured to select a sequence with max similarity and highest frequency as the desired sequence. For the novel process segments, the sequence having closest process step order within a process segment is used to keep process step unity.

For a target plan, the process prediction system of the present disclosure provides an initial allocation of workstations and the process steps to be performed at the workstations. Generally, a manufacturing process is split into multiple process segments that are executed across multiple workstations. The process prediction system preserves coherence of the process steps to be performed for a given process segment by allocating a process segment to a workstation verse separating the process steps from the process segments and treating each process step independently.

The process prediction system is configured to employ natural language processing techniques to transform the textual descriptions into vectors to represent semantic meaning, and further utilize deep learning self-attention mechanism to discover the hidden sequential patterns among process steps. Accordingly, the process prediction system is configured to compare process steps between the target and surrogate process segments, which improves allocation performance.

In addition, the sequence inference model, which employs the Bayesian Inference modeling, is configured to classify (i.e., Bayesian classification) the target process segments to a sequence, and further classify individual process steps. More specifically, the sequence inference model determines the probability distribution of a target process segment over possible sequences provided by the surrogate process segments and classify the target process segment to the sequence with the maximum/highest probability. Accordingly, the process prediction system of the present disclosure may decrease the time and resources needed for developing a new manufacturing process.

Figure 4:
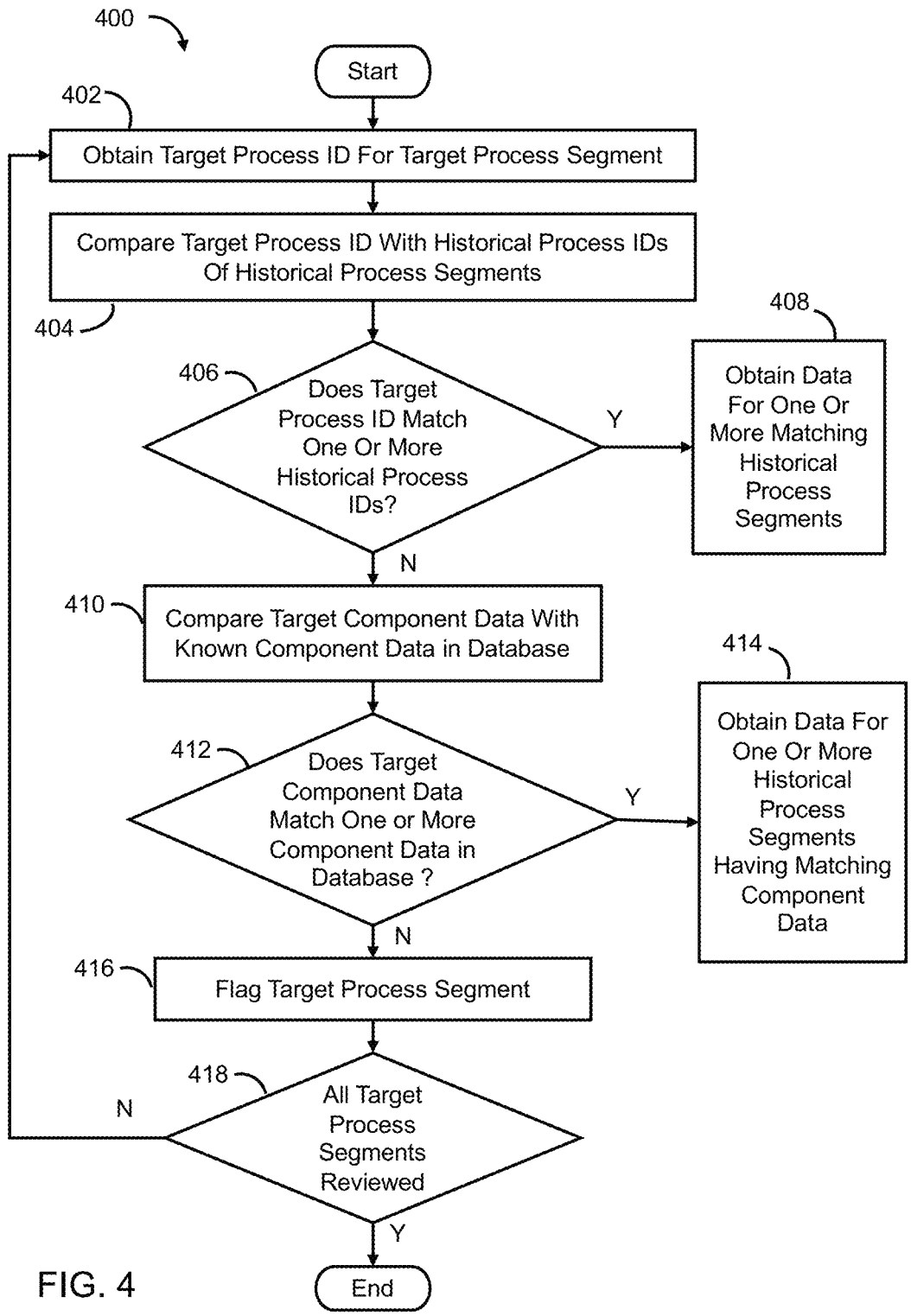
FIG. 4 is a flowchart of an example segment classification routine performed by the process prediction system in accordance with the present disclosure.

Referring to FIG. 4, an example segment classification routine 400 performed by the process prediction system of the present disclosure is provided. At 402, based on the target plan received, the system obtains the target process ID for the first target process segment and, at 404, compares the target process ID with the historical process IDs of the historical process segments. At 406, the system determines if the target ID matches one or more historical process IDs. That is, the system classifies the target process segment as being either a documented process segment or a novel process segment. If so, the system obtains data associated with the one or more matching historical process segments, which are provided as surrogate process segments, at 408. If there is no match (i.e., a target process segment is a novel process segment), the system, at 410, compares the target component data for the target process segment with that known component data provided in the historical database. At 412, the system determines whether there is a match in the component data. That is, the system determines if there is a historical process segment that can serve as a proxy process segment based on the component data. If there is a match in the target component data with the known component data, the system obtains data for the one or more historical process segments having the matching component data as that of the target component, at 414. In one form, at least one component data information of the target component data should match the known component data of a single historical process segment. In another form, all of the target component data should match the known component data for a single historical process segment. If the target component data does not match, the system flags the target process segment for further review, at 416. Once flagged, a user may further evaluate the flagged target process segment and the flagged target process segment is not used to develop the target process. At 418, the system determines if all of the target process segments have been reviewed. If not, the system goes to the next target process segment by returning to 402. If all target process segments have been reviewed, the routine ends.

Figure 5:
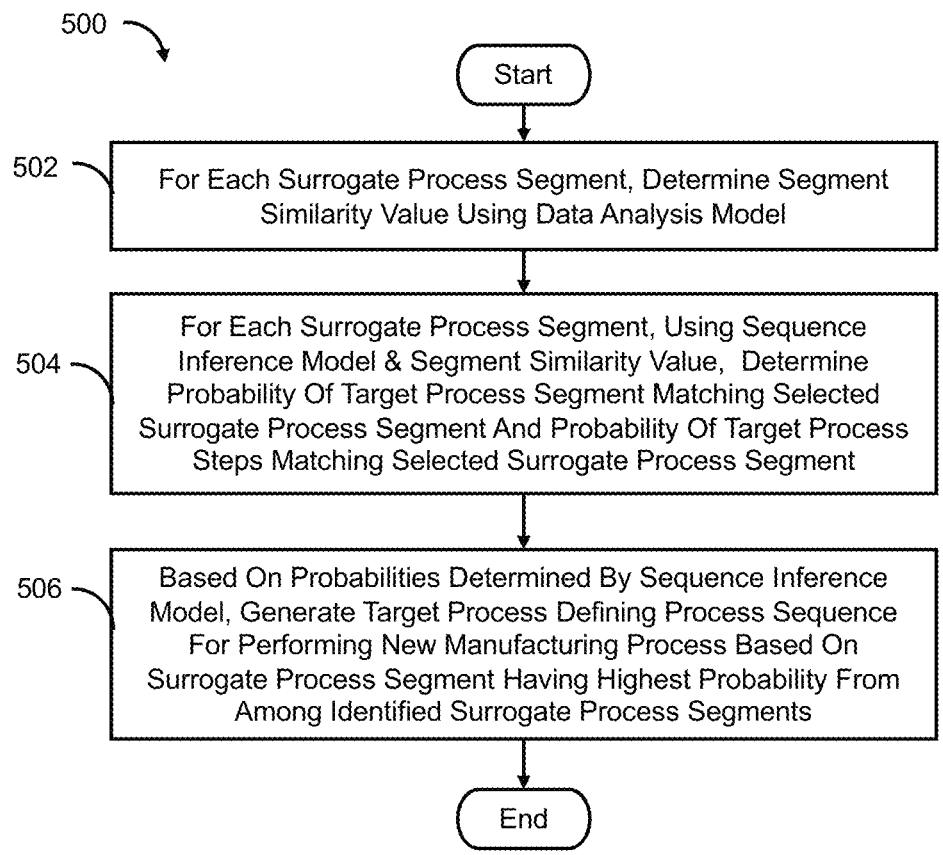
FIG. 5 is a flowchart of an example target process prediction routine performed by the process prediction system in accordance with the present disclosure.

Referring to FIG. 5, an example target process prediction routine 500 performed by the process prediction system of the present disclosure is provided. At 502, for each surrogate process segment, the process prediction system determines a segment similarity value using a data analysis model, as described in detail above. At 504, for each surrogate process segment, the process prediction system determines a probability distribution of the target process segment with respect to a selected process segment based on the segment similarity value. More particularly, using the sequence inference model and as detailed above, the process prediction system determines the probability of the target process segment matching the selected surrogate process segment and the probability of the target process steps matching the selected surrogate process segment. At 506, the system generates a target process for the target plan, where the target process defines a process sequence for performing the new manufacturing process based on the surrogate process segment having highest probability from among identified surrogate process segments. The target process further allocates workstations for the various process sequence.

It should be readily understood that the routines 400 and 500 can be configured in various suitable ways and the process prediction system of the present disclosure should not be limited to the routines 400 and 500. For example, the target process prediction routine can also include an evaluation of the proxy process segments as described above. In another example, the target process prediction routine can also include a step of performing the pooling model as described above.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of predicting sequence for a manufacturing process to assemble a product, the method comprising:
obtaining a target plan for the manufacturing process, wherein the target plan defines a process segment to be performed during the manufacturing process, wherein the process segment is defined by a plurality of a process steps for performing the process segment;
retrieving, from a historical process database, a plurality of surrogate process segments based on the target plan, wherein the historical process database stores a plurality of historical process segments for known manufacturing processes, each historical process segment is defined by a plurality of known process steps provided in sequential order for performing the historical process segment, wherein the plurality of surrogate process segments are selected from among the plurality of historical process segments;
determining, for each surrogate process segment from the plurality of surrogate process segments, a segment similarity value based on a data analysis model configured to provide a quantitative value representing a textual similarity and a sequence similarity between the surrogate process segment and the process segment of the target plan; and
generating a target process defining a process sequence for performing the manufacturing process based on the segment similarity values of the plurality of surrogate process segments and a sequence inference model that classifies the process segment of the target plan to sequences defined by the plurality of surrogate process segments, wherein the target process includes data that defines a plurality of selected process steps and one or more workstations for the process segment of the target plan.

2. The method of claim 1, wherein the data analysis model for determining the segment similarity value further comprises:
comparing data indicative of the surrogate process segment with data indicative of the process segment using a natural language process model to determine a sequential pattern; and
determining a process similarity value for the surrogate process segment based on the sequential pattern.

3. The method of claim 2, wherein the process similarity value is determined using a universal sentence encoder.

4. The method of claim 1, wherein:
the target plan identifies one or more components to be employed for the process segment, and
each of the historical process segments identifies one or more known components to be employed for the historical process segment.

5. The method of claim 4 further comprising comparing the one or more known components with the one or more components of the target plan using a string-matching model to determine a component similarity value, wherein the segment similarity value is a summation of the process similarity value and the component similarity value.

6. The method of claim 5 wherein the string-matching model employs Levenshtein distance.

7. The method of claim 4, wherein the target plan is defined by a plurality of the process segments, the method further comprises:
classifying each of the process segments as a novel process segment or a documented process segment; and
retrieving, from the historical process database, one or more proxy process segments for the novel process segment, wherein the one or more proxy process segments are selected from among the plurality of historical process segments based on the one or more components of the novel process segment, wherein at least one component of the one or more components of the novel process segment match at least one component provided in the proxy process segments, wherein the plurality of surrogate process segments are selected for the documented process segments of the target plan; and
determining, for the one or more proxy process segments, an overall proxy similarity value of the proxy process segment based on the data analysis model, wherein the target process is further generated based on the overall proxy similarity values of the proxy process segments and the sequence inference model.

8. The method of claim 1, wherein the sequence inference model is a Bayesian inference based model.

9. The method of claim 1, wherein generating the target process further comprises selecting a desired sequence from the sequences defined by the surrogate process segments based on a pooling model, wherein the desired sequence has highest similarity value than other sequences.

10. A method of predicting sequence for a manufacturing process to assemble a product, the method comprising:
obtaining a target plan for the manufacturing process, wherein the target plan defines a process segment to be performed during the manufacturing process using one or more components, wherein the process segment is defined by a plurality of a process steps provided in a sequential order for performing the process segment, wherein for the process segment, the target plan includes a target process data and a target component data that identifies the one or more components to be employed for the process segment;
retrieving, from a historical process database, a plurality of surrogate process segments based on the target process data, wherein the historical process database stores a plurality of historical process segments for known manufacturing processes using one or more known components, each historical process segment is defined by a plurality of known process steps provided in sequential order for performing the historical process segment, wherein the plurality of surrogate process segments are selected from among the plurality of historical process segments, and the historical process segment includes a known process data, a known component data, and an allocated workstation data;

determining, for each surrogate process segment from the plurality of surrogate process segments, a segment similarity value based on a data analysis model, wherein the data analysis model is configured to provide a quantitative value representing a textual similarity and a sequence similarity between the surrogate process segment and the process segment of the target plan; and generating a target process defining a process sequence for performing the manufacturing process based on the segment similarity values of the plurality of surrogate process segments and a sequence inference model that classifies the process segment of the target plan to sequences defined by the plurality of surrogate process segments, wherein the target process includes data that defines a plurality of selected process steps and one or more workstations for the process segment of the target plan.

11. The method of claim 10, wherein the data analysis model for determining the segment similarity value further comprises:

comparing the known process data with the target process data using a natural language process model to determine a sequential pattern;

determining a process similarity value for the known process data relative to the target process data based on the sequential pattern; and comparing the known component data with the target component data using a string-matching model to determine a component similarity value, wherein the segment similarity value is a summation of the process similarity value and the component similarity value.

12. The method of claim 11, wherein the string-matching model employs Levenshtein distance.

13. The method of claim 11, wherein the process similarity value is determined using a universal sentence encoder.

14. The method of claim 11, wherein:

for each of the plurality of process steps, the target process data includes a textual data string describing a respective process step and a process time, for each of the plurality of known process steps, the known process data includes a textual data string describing a respective known process steps and a known process time for the known process step, and the natural language process model employs a universal sentence encoder to define numerical vectors to process the textual data string of the known process data and of the target process data.

15. The method of claim 10, wherein the sequence inference model is a Bayesian inference based model.

16. The method of claim 10, wherein the target plan is defined by a plurality of the process segments, the method further comprises:

classifying each of the process segments as a novel process segment or a documented process segment based on the target process data for the process segment and the known process data of the plurality of historical process segments;

retrieving, from the historical process database, one or more proxy process segments for the novel process segment based on the target component data of the novel process segment, wherein the one or more proxy process segments are selected from among the plurality of historical process segments based on the target component data and the known component data, wherein the known component data of the proxy process segments matches at least one component provided in the target component data of the novel process segment, wherein the plurality of surrogate process segments are selected for the documented process segments of the target plan; and determining, for the one or more proxy process segments, an overall proxy similarity value of the proxy process segment based on the data analysis model, wherein the target process is further generated based on the overall proxy similarity values of the proxy process segments and the sequence inference model.

17. The method of claim 16, wherein:

the target process data includes a process identification for the process segment, the known process data includes a known process identification for a respective historical process segment, the process segment among the plurality of the process segments is classified as the documented process segment in response to the process identification matching the known process identification, and the process segment among the plurality of the process segments is classified as the novel process segment in response to the process identification not matching the known process identification of the known process segments in the historical database.

18. The method of claim 16, wherein:

the target component data includes data indicative of a tool identification, a tool name, a manufacturing part identification, a manufacturing part name, or a combination thereof, the known component data includes data indicative of a known tool identification, a known tool name, a known manufacturing part identification, a known manufacturing part name, or a combination thereof, and the known component data of the proxy process segment matches at least one data of the target component data of the novel process segment.

19. The method of claim 10, wherein:

the target component data includes data indicative of a tool identification, a tool name, a manufacturing part identification, a manufacturing part name, or a combination thereof, and the known component data includes data indicative of a known tool identification, a known tool name, a known manufacturing part identification, a known manufacturing part name, or a combination thereof.

20. The method of claim 10, wherein generating the target process further comprises selecting a desired sequence from the sequences defined by the surrogate process segments based on a pooling model, wherein the desired sequence has highest similarity value than other sequences.

* * * * *